United States Patent
De Jong

[15] 3,652,789
[45] Mar. 28, 1972

[54] REPRODUCTION SYSTEM FOR AIRCRAFT SCANNERS

[72] Inventor: Arie N. De Jong, Pijnacker, Netherlands

[73] Assignee: Nederlandse, Organisatie voor Toegepast-Natuurweten-Schappelijk Onderzoek, The Hague, Netherlands

[22] Filed: Aug. 12, 1969

[21] Appl. No.: 849,412

[30] Foreign Application Priority Data

Aug. 29, 1968  Netherlands..........................6812267

[52] U.S. Cl. .........................................178/6.7 R, 346/108
[51] Int. Cl.......................................H04n 5/72, H04n 5/86
[58] Field of Search..................178/6.7, 6.7 A; 346/78, 108; 95/15, 12.5

[56] References Cited

UNITED STATES PATENTS 3,316,348  4/1967  Hufnagel et al........................178/6.7
3,468,230  9/1969  Bellows...................................95/12.5

Primary Examiner—Stanley M. Urynowicz, Jr.
Assistant Examiner—Steven B. Pokotilow
Attorney—Watson, Cole, Grindle & Watson

[57] ABSTRACT

The invention relates to a device for filming an area scanned electronically with the aid of an aircraft.

The scanning results in a number of intensity-modulated beams of rays produced by crater lamps. Between the crater lamps and the film are provided a fiber sheet, a transmission filter and a zoom lens, the zoom position of which is coupled with the film transport, which transport itself is carried out in such a way that the film velocity is adapted to the aircraft velocity/aircraft height ratio.

The conditions of fiber sheet and transmission filter are coupled with the position of a rotating mirror for exposing the film.

Sheet and filter are provided between zoom lens and rotating mirror.

2 Claims, 3 Drawing Figures

PATENTED MAR 28 1972 3,652,789

INVENTOR.
BY Arie N. de Jong
Watson, Cole, Grindle & Watson
attorneys

REPRODUCTION SYSTEM FOR AIRCRAFT SCANNERS

Devices for recording intensity-modulated beams of rays produced by lamps, the beams being imaged on a film via a rotating mirror and being provided with means for adapting the film velocity to the aircraft velocity/aircraft height ratio, are well known in the art.

This known device is used for reproducing signals emanating from a row of photo-electric cells in the focal surface of the lens of an infrared camera that takes pictures by means of collections of recordings, which collections comprise a number of parallelly scanned lines perpendicular to the line of flight.

On reproduction a signal from a cell of the row of cells modulates the intensity of the beam of rays of one crater lamp of a number of crater lamps equal to the number of cells. The beams of rays of the crater lamps are recorded on a film as images of scanned lines. The condition for distortion-free images has been obtained by proportioning the film velocity to the aircraft velocity/aircraft height ratio. In the device known in the art this is met by making the film velocity variable according to the said ratio. Yet drawbacks in imaging occur. The images of the lines scanned in the collection for instance do not show a parallel course. For the collections show a narrowing at the sides of the film. Also, the collections of images do not abut on the film under certain circumstances. It is the object of the invention to avoid these drawbacks.

For this purpose the invention is characterized by the fact that a zoom lens, the zoom position of which is coupled with the film transport, is provided between the lamps and the film and that a fiber sheet and a transmission filter, the conditions of which are coupled with the position of the scanning mirror, are provided between lens and scanning mirror.

Through adjustment of the focal distance, the zoom lens then serves to obtain abutting collections of images. Through the shape of the fiber sheet the collection narrowing at the sides of the film is removed and across the effective film surface the collections are imaged clearly. Because of the course of the transmission across the transmission filter the exposure across the effective surface becomes even.

In a practical embodiment, fiber sheet and transmission filter are provided on the shaft of the rotating mirror, causing the adjustment of sheet and filter to be coupled automatically with the position of the rotating mirror. The invention will now further be elucidated with reference to a drawing with three figures.

In the figures like numbers and letters refer to like elements.

Figure 1:
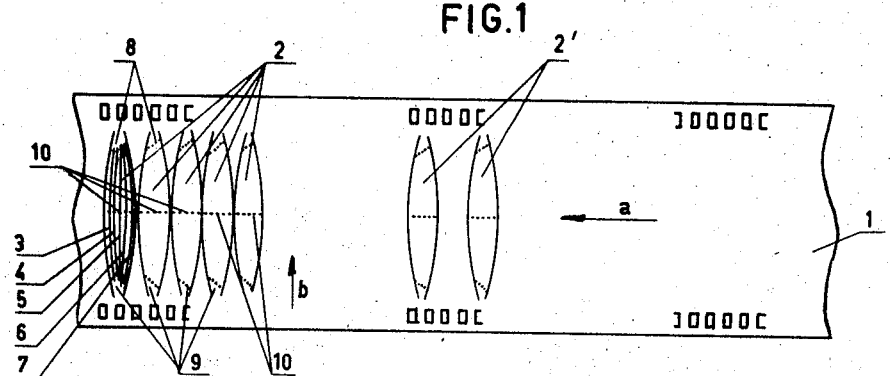
FIG. 1 shows a recording, with a typical non-abutting collections and with a typical collection narrowing at the sides of the film, by a camera with five cells in the focal plane of the objective.

In FIG. 1 arrow direction $a$ on film 1 shows the line of flight and arrow direction $b$ the direction of line-scanning. Each collection 2 comprising five simultaneously scanned lines 3, 4, 5, 6 and 7 converging at ends 8 and 9. Collections 2 are abutting, collections 2' do not abut as a result of a modification in the aircraft velocity $v$ to aircraft height $h$ ratio.

Figure 2:
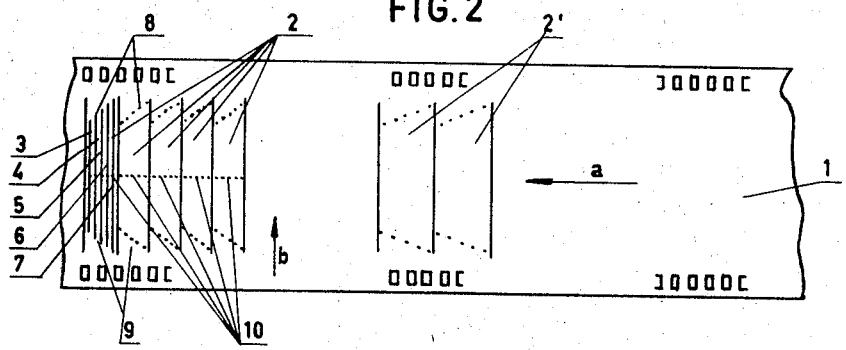
FIG. 2 shows a recording on a film with abutting collections and without collection narrowing by application of the invention.

Abutting collections 2 and 2' that do not converge at ends 8, 9, as is shown in FIG. 2, are the object of the invention. In FIG. 2 collections 2' are invariably abutting by application of a zoom lens the adjustment of which has been made dependent on the said $v/h$ ratio. As was observed in the introduction to the description, in the camera known in the art the film velocity is not constant, but this velocity is controlled in proportion to the $v/h$ value of the aircraft to avoid the occurrence of distortions in recordings. By application of a zoom lens instead of a fixed lens and by providing a coupling between the film transport and this zoom lens can now be achieved that collections 2 and 2' abut for all $v/h$ values.

Figure 3:
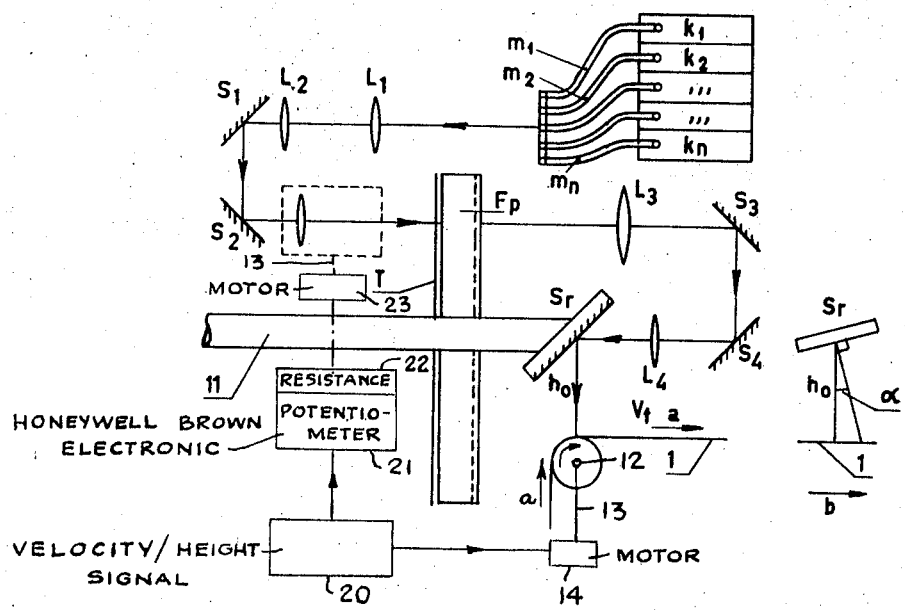
FIG. 3 shows schematically an embodiment of a recording device according to the invention.

In FIG. 3 crater lamps $k_1$ to $k_n$ are arranged together into a row of light sources with the aid of flexible light fibers $m_1$ to $m_n$. Between the said row of light sources $m_1$ to $m_n$ and rotating mirror $S_r$ zoom lens $L_z$ is mounted, the magnification of which is mechanically and electrically coupled with shaft 12 of the film transport, in any convenient manner as indicated schematically by the dotted line 13, for transferring the $v/h$ signal from shaft 12 to zoom lens $L_z$. Between light sources $m_1$ to $m_r$ and zoom lens $L_z$ lenses $L_1$ and $L_2$ and mirrors $S_1$ and $S_2$ are placed. In the path of the rays after zoom lens $L_z$ a hoop-shaped and rotating transmission filter T and a hoop-shaped and rotating fiber sheet $F_p$ follow, both connected to shaft 11 of rotating mirror $S_r$, a lens $L_3$, two plane mirrors $S_3$ and $S_4$, a lens $L_4$ and rotating mirror $S_r$. Film 1 moves through with the use of any conventional motor means 14, in the direction of arrow $a$ with a velocity $V_f$ in proportion the the $v/h$ ratio, as made available from a conventional $v/h$ meter used for this purpose, at a distance $h_o/\cos\alpha$ of mirror $S_r$. Between the zoom adjustment for lens $L_z$ and shaft 12 of the spool over which runs film 1, a conventional coupling 13 is provided of a type normally employed in this art.

It should be noted that the standard and well-known velocity/height signals, shown at 20 in FIG. 3, are utilized for the present invention. From these signals a quotient is calculated which is converted into a displacement signal by a Honeywell Brown Potentiometer 21. This Brown Potentiometer 21 adjusts the position of a sliding-contact on a resistance 22. Said resistance forms a part of the resistance-controlled motor 23 drive, which displaces zoom lens $L_z$. Said resistance-controlled motor-driven zoom lens is a well-known commodity. In this commercially available zoom lens, a position on said resistance always corresponds with a specific adjustment of the zoom lens.

By application of a fiber sheet $F_r$ between zoom lens $L_z$ and rotating mirror $S_r$ it is achieved that always at all positions of mirror $S_r$, with respect to film 1, on film 1 is imaged clearly. For this purpose fiber sheet $F_p$ has an increase in thickness $\Delta$ depending on rotation angle $\alpha$ of mirror shaft 11 according to formula:

$$\Delta = h_o/V_o^2 (1-\cos\alpha) \qquad (1)$$

In this, $V_o$ is the magnification after the fiber sheet for $\alpha = 0$.

Through the variation in thickness of the fiber sheet the front and back focal lengths in the imaging system $L_3$, $S_3$, $S_4$, $L_4$, $S_r$ vary. Thereby magnification V varies.

A further purpose of fiber sheet $F_p$ is to adjust the magnification at all positions of mirror $S_r$, thus removing collection narrowings at ends 8 and 9. By using the variations in the magnification resulting from variations in thickness in the fiber sheet collection narrowings can also be removed. In general for the magnification holds good $$V = \frac{h_o}{\cos\alpha} \frac{d-(f_1+f_2)}{f_1 \cdot f_2} \qquad (2)$$

Herein $f_1$ and $f_2$ are the focal distances of lenses $L_3$ and $L_4$ and $d$ is the distance between lenses $L_3$ and $L_4$.

Further the relation:

$$1 = f_2 \frac{d-f_1}{d-(f_1+f_2)} \qquad (3)$$

holds good, in which 1 is the distance between lens $L_4$ and rotating mirror $S_r$. With the aid of the above formulas (1), (2) and (3) it is possible to calculate an imaging system that in combination with a fiber sheet allows a recording the collections of which do not narrow at the sides and at the same time are imaged clearly.

Example: For 70 mm. film $h_o = 17$ mm.

For $\alpha = 60°$ and $V_o = 2$, $\Delta$ becomes 2.1 mm.

For correction of the uneven exposure of the film across its width a transmission filter T is provided, which simultaneously turns along with the fiber sheet. The transmission varies as a function of $\alpha$.

$$t_{(\alpha)} = \frac{t_{(o)}}{\cos^3\alpha}$$

I claim:

1. A device for recording intensity-modulated beams of rays produced by lamps, the beams imaged on a film via a rotating mirror and said film being driven by a motor means for adapting the film velocity to an aircraft velocity/aircraft height ratio, wherein a zoom lens, the zoom position of which is coupled by a coupling means with the film transport, is provided between the lamps and the film and wherein a fiber sheet and a transmission filter, each of which are coupled with a rotatable shaft of the rotating mirror, are provided between said lens and said mirror, said fiber sheet having an increase in thickness $\Delta$ depending on rotation angle $\alpha$ of said rotatable shaft according to the formula: $\Delta = h_o/V_o^2 (1-\cos\alpha)$, where $V_o$ is the magnification after the fiber sheet for $\alpha=0$ and $h_o$ is the perpendicular distance from said film to the axis of said rotating mirror.

2. A device according to claim 1, wherein said fiber sheet and transmission filter are mounted on said shaft of the rotating mirror, the beams of rays passing the sheet and the filter momentarily in a point outside the shaft.